Oct. 11, 1938.   T. B. TYLER   2,133,001
MEANS FOR CORRELATING SPEED OF CLUTCH ENGAGEMENT TO SPEED OF VEHICLE
Filed June 2, 1932   4 Sheets-Sheet 1

INVENTOR
Tracy Brooks Tyler
BY
ATTORNEY

Oct. 11, 1938.  T. B. TYLER  2,133,001
MEANS FOR CORRELATING SPEED OF CLUTCH ENGAGEMENT TO SPEED OF VEHICLE
Filed June 2, 1932  4 Sheets-Sheet 2

INVENTOR
Tracy Brooks Tyler
BY
ATTORNEY

Oct. 11, 1938.  T. B. TYLER  2,133,001

MEANS FOR CORRELATING SPEED OF CLUTCH ENGAGEMENT TO SPEED OF VEHICLE

Filed June 2, 1932  4 Sheets-Sheet 3

INVENTOR
Tracy Brooks Tyler
BY
ATTORNEY

INVENTOR
Tracy Brooks Tyler
BY
ATTORNEYS

Patented Oct. 11, 1938

2,133,001

UNITED STATES PATENT OFFICE 2,133,001

MEANS FOR CORRELATING SPEED OF CLUTCH ENGAGEMENT FOR SPEED OF VEHICLE

Tracy Brooks Tyler, Detroit, Mich., assignor to The Monopower Corporation, Detroit, Mich., a corporation of Michigan Application June 2, 1932, Serial No. 614,944

2 Claims. (Cl. 192—.01)

This invention relates to clutch control mechanisms, particularly adapted for use with power actuated clutches of automobiles.

It is well known, in the operation of automobiles, that it is desirable to correlate the speed of clutch engagement with the speed of the vehicle, so that the clutch parts will be engaged slowly when the vehicle is moving slowly and more rapidly when the vehicle is moving more rapidly. With pedally operated clutches, which are at all times under the personal control of the vehicle operator, such correlation is a simple matter and is effected by permitting the clutch pedal to move back more slowly when the vehicle is moving slowly than when the vehicle is moving rapidly. In fact, in the case of pedally operated clutches, such correlation is effected more or less sub-consciously by the operator.

With the advent of power actuated clutches, that is to say, clutches actuated by means whose speed is not under the control of the operator, the desirability of providing a control for the speed of the actuating means becomes apparent.

It has been proposed to provide a control which is correlated to the gear selection in the transmission and thus indirectly to the speed of the vehicle. For example, a mechanism has been provided which causes the clutch to be engaged slowly when the vehicle is in low gear, a bit more rapidly when the vehicle is in intermediate gear and still more rapidly when the vehicle is in high gear.

One important objection to such mechanism is observed at this time. It often occurs to the operator to start his vehicle in intermediate gear and with a construction as mentioned in the foregoing, the clutch will be actuated more rapidly than is desirable, because of the fact that the vehicle is in intermediate gear. The clutch actuation in such a case is too rapid for smooth starting, because, though the vehicle is in intermediate gear, its speed is still low, the vehicle having started from rest.

Further, at times the operator may desire to shift from low gear to high gear directly, even though the vehicle is at relatively low speed, and the mechanism described in the foregoing causes the clutch parts to engage more rapidly than they should.

Further, sometimes the shift from intermediate gear to high gear is made when the vehicle is at fairly low speed and at other times the shift is made when the vehicle is at fairly high speed. In these two instances, the speed of clutch engagement, though it should vary with the speed of the vehicle, with the mechanism described in the foregoing, will be the same, because it is correlated to the gear selection.

The invention of this application aims to provide a mechanism which will correlate the speed of clutch engagement directly and positively to the speed of the vehicle, regardless of the gear selection that happens to be in effect. In the embodiments disclosed the clutch actuating mechanism is operatively connected to and is influenced by a driving part of the vehicle, namely, the propeller shaft, and the speed of the latter governs the speed of clutch engagement, regardless of the gear selection.

The invention further aims to provide control mechanisms for clutch actuating means, the control mechanisms being of various types, as disclosed in the various embodiments, and all having as an underlying thought the idea of correlating the speed of clutch engagement positively to the speed of the propeller shaft.

The invention further aims to provide means for correlating the rate of actuation of a variable actuator, preferably though not necessarily, a clutch actuator, to the speed of a moving part, preferably though not necessarily the propeller shaft of an automobile.

Still further aims and objects of the present invention will be observed more readily upon reference to the following detailed description of embodiments of the invention and to the appended drawings in which Figure 1 shows one form of clutch actuator, with its associated parts;

Figure 4:
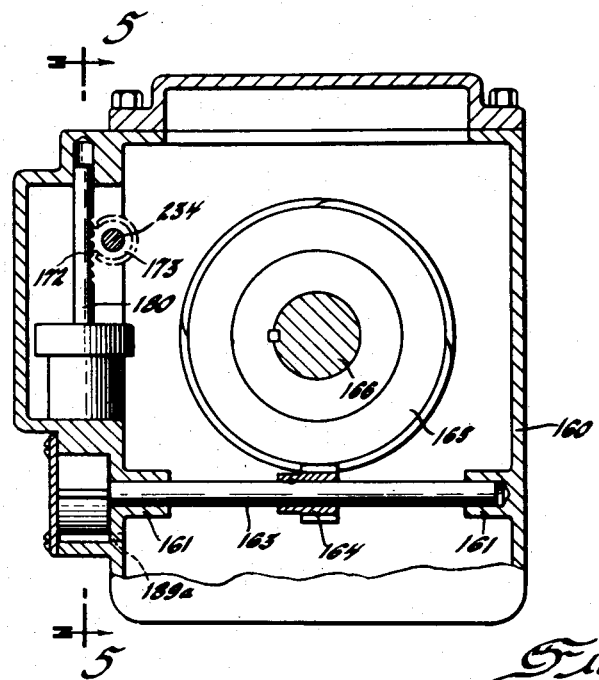
Figures 5, 5A:
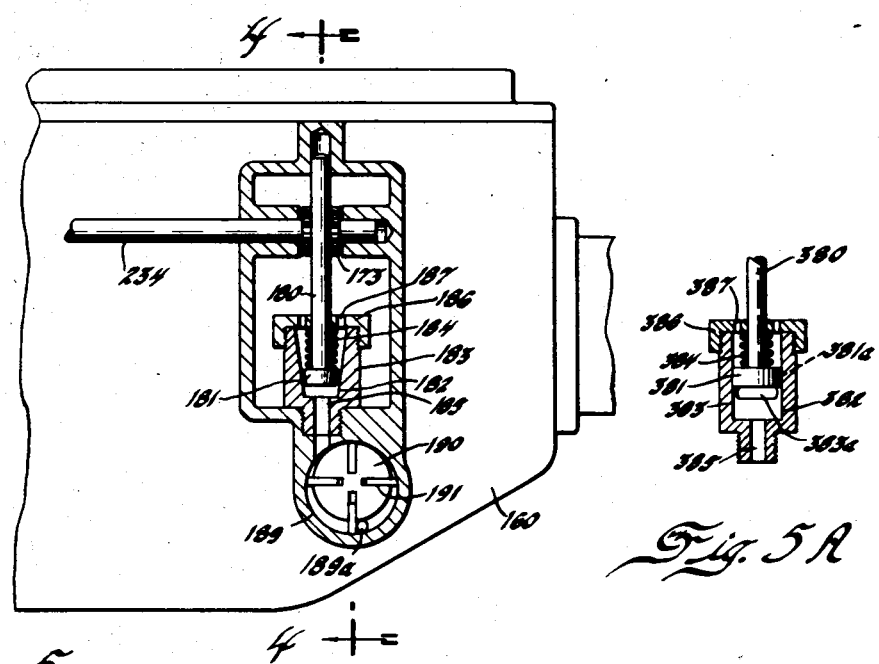
Figure 6:
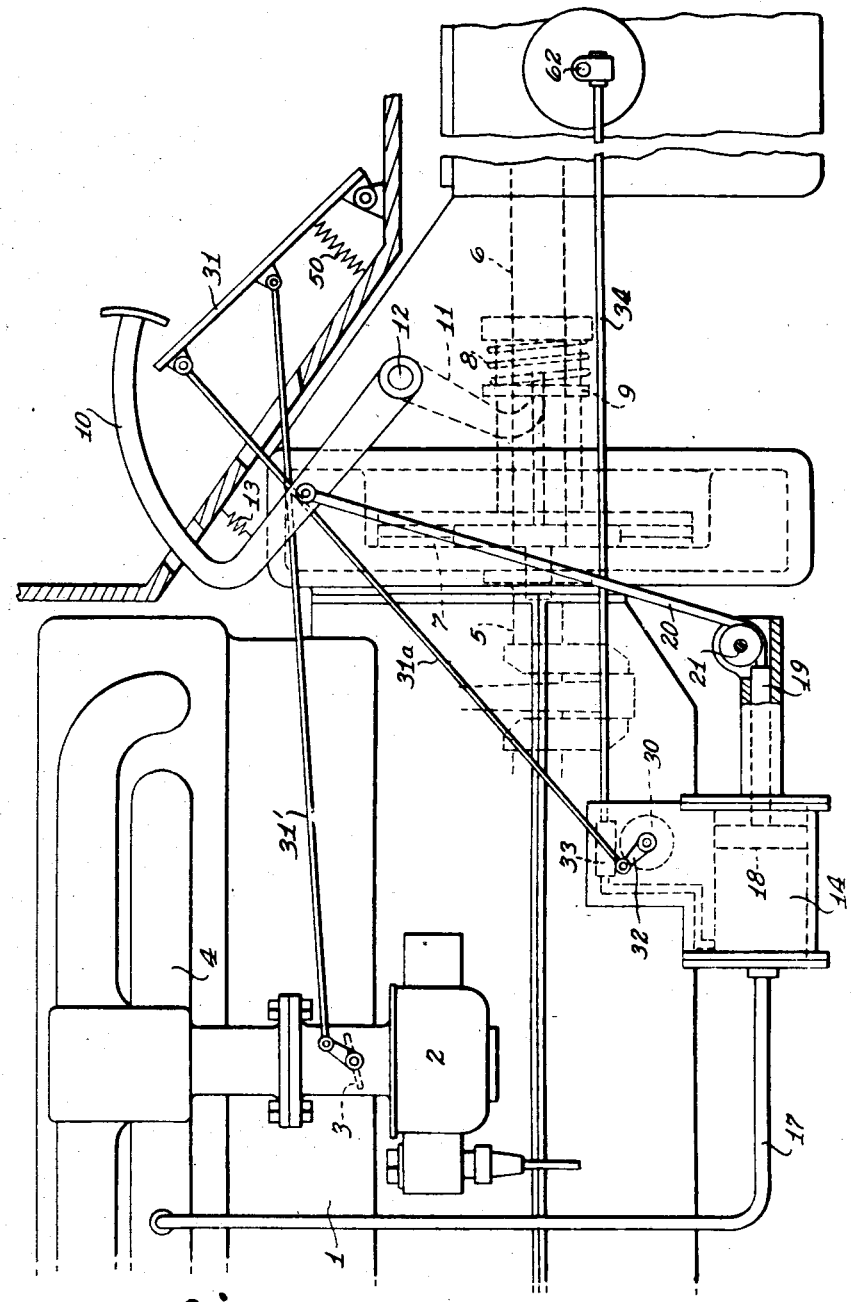

Figs. 4 and 5 show a second form of control means, and are sections as if on lines 4—4 and 5—5 of Figs. 5 and 4 respectively;

Fig. 5a shows a modification of the control device of Fig. 5 and may be used with the valve of Fig. 1b, and Fig. 6 is a fragmentary vertical cross section of an automotive vehicle illustrating the present invention assembled thereon.

In Fig. 6 the numeral 1 designates an engine having a carburetor 2 provided with the usual control valve 3 and connected to an intake manifold 4. The engine shaft is indicated at 5 and is adapted to be connected to a drive shaft 6 by a clutch 7 having a spring 8 adapted to move the same to its engaged position and a collar 9 engaged by a lever 11 on a clutch shaft 12 so that upon rotation of the latter the clutch is disengaged. A clutch pedal 10 is mounted on the clutch shaft 12 and is adapted to be moved downwardly to rotate the shaft 12 in a direction so that the lever 11 is moved to disengage the clutch 7, either by pressure exerted thereon by an operator, or by a clutch actuator.

The clutch actuator includes a cylinder 14 having a low pressure port 15 and a high pressure port 16. The low pressure port is connected to the intake manifold 4 of the engine 1 by a conduit 17, in which case the high pressure port is connected to atmosphere through a valve to be described later.

In the cylinder is a piston plunger 18 connected to the clutch pedal by a rod 19 and a cable 20, the latter passing over a fixed pulley 21. It will be readily seen at this time that a difference in pressure on opposite sides of the plunger 18 will cause actuation of the clutch parts.

The actuator is controlled by two valves, operating in tandem. One of these valves, referenced 30, is moved by the operator through a manipulator pedal 31, link 31ª and crank 32 (in dotted lines) and its position determines the fact of operation of the actuator, that is to say, whether the actuator will or will not operate to move the clutch parts. The other valve, referenced 33, is connected to the propeller shaft through an actuator control rod 34 and a governor or variable control device to be described later, and its position determines the rate of operation of the actuator, correlating the same to the speed of the propeller shaft. The manipulator pedal 31 is connected by a rod 31' to the carburetor valve or throttle control valve 3.

The valve 30 is in the form of an axially rotatable cylinder and has three peripheral, shallow and wide slots or reliefs 35, 36, and 37, as shown. Two of these, 35 and 36, are of uniform depth; the third, 37, is of non-uniform depth to define a wedge shaped passage. The valve further has a transverse bore 37ª connecting reliefs 35 and 37, as shown.

The valve 33 is also cylindrical and axially rotatable and has on its periphery a part-circumferential slot 38 (Fig. 1a) into which opens a partial transverse bore 38a, the latter also opening into an axial partial bore 39, which opens to the end of the valve. The slot 38 is of non-uniform width or wedge shaped, as shown, and the effective size of the opening through valve 33 depends upon the position of the valve in the valve body, in a manner and for reasons to be described later.

The valves 30 and 33 are disposed and axially rotatable in chambers 40 and 41 of a valve body 42. Into chamber 40 opens the following ports: 16, connected to the cylinder 14; 43, open to atmosphere; 44, open to chamber 41; and 44a, open to an L shaped passage 45 leading to the cylinder 14 through a port 46. Into chamber 41 open the following ports: 44, open to chamber 40; and 47, open to passage 45.

The operation of the actuator without regard to its rate of operation, may be described as follows:

When the engine is not running the parts will be in the position shown, and this may be assumed as a starting position.

When the engine is started and while it is idling, suction in the intake manifold (or pressure through 43—36—16) will move plunger 18 to the left, to move the clutch pedal down to move clutch 7 to its disengaged position.

If the operator puts the vehicle in gear, at this time, and then steps upon the throttle or manipulator pedal 31 to start the vehicle, the valve 30 will be rotated counterclockwise, registering relief 35 with port 16, whereupon the air in back of plunger 18 will bleed out through 16—35—37a—37—44 valve 33 (slot 38) 47—45—46 to the low pressure side of the cylinder, to the left of plunger 18, permitting spring 13 to move the clutch pedal up to clutch engaged position.

Figure 1:
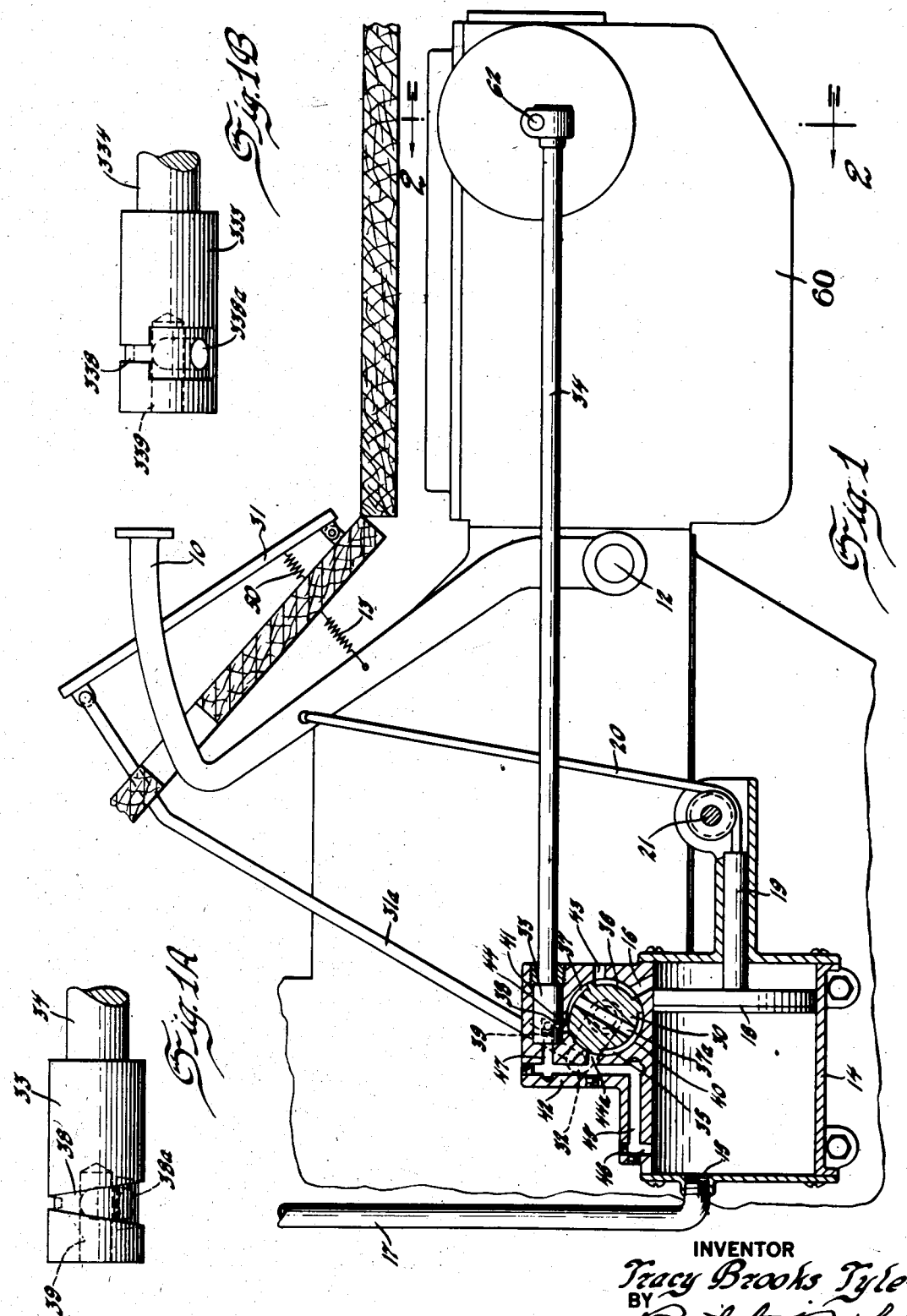
Figs. 1a and 1b show two forms of valves for use with the actuator, the form of Fig. 1a being shown in use in the actuator of Fig. 1.

The parts will remain in the last named position until the operator releases the throttle or manipulator pedal, whereupon the spring 50 will restore the valve parts to the position of Fig. 1, to cause the clutch parts to be disengaged.

Thus far little mention has been made of the means to control or vary the speed of the clutch actuator and since the invention is principally concerned with such control means, the same will now be described.

Figure 2:
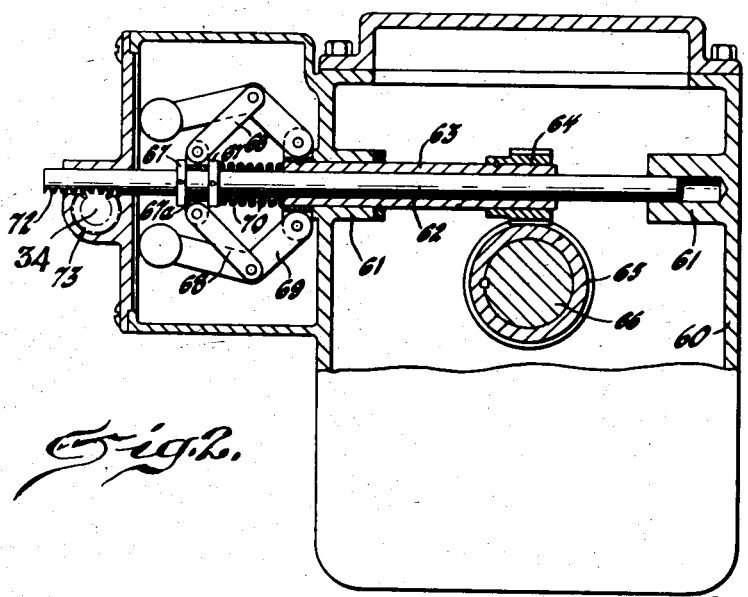
Fig. 2 shows one form of control means, and is a section as if on line 2—2 of Fig. 1.

The actuator control means or the means to correlate the speed of the actuator with the speed of the propeller shaft is shown in Fig. 2, and includes a casing 60 having bearings 61, in which is mounted a slidable shaft 62 journaled in a non-slidable but rotatable sleeve 63. To the latter is secured a spiral pinion 64 meshing with a spiral gear 65 secured to the propeller shaft of the vehicle 66, the latter projecting into the casing 60. On the shaft are fixed collars 67 between which governor links 68 are rotatably connected to the shaft 62 by a collar 67a. The links are also connected to the weighted governor arms 69, these in turn being connected to the rotating sleeve 63. A spring 70, surrounding the shaft 62 tends to expand and thus counteract the influence of the weighted arms 69. These arms tend to move the shaft 62 to the right, Fig. 2, while spring 70 tends to move shaft 62 to the left, Fig. 2.

The shaft 62 at its free end, is provided with rack teeth 72 meshing with a pinion 73 on the end of the rod 34 which connects to the valve 33, the latter, as previously mentioned, having a wedged shaped slot 38 whose position with respect to the port 44, determines the rate at which the pressure medium in the actuator cylinder, will bleed out to the low pressure side, thus determining the return speed of the clutch actuator. It will be seen that when the propeller shaft is at rest, or is rotating slowly, the governor arms will be "in", and the rod 34 will be so positioned that the narrow end of the slot 38 will be in register with port 44. Conversely, when the propeller shaft is rotating rapidly, the arms 69 will be "out" and the rod 34 will have been rotated to cause the wider part of slot 38 to register with port 44 of the actuator.

The control operation just described effectively causes the clutch to be engaged slowly when the vehicle is at rest or is moving slowly and causes the clutch to be engaged more rapidly when the vehicle is moving rapidly, all this taking place without regard to the gear selected, or to any other factor.

The control operation might well be described as follows, in connection with a schedule of vehicle operation: Assume the vehicle is at rest, in neutral, and the motor running. At this time the clutch pedal will have been pulled in (disengaged) by the suction from the engine intake.

To start the vehicle, the operator shifts gears to low and steps on the manipulator pedal. The rotary valve 30 is turned to create a by-pass around plunger 18, the by-pass being of small capacity due to the fact that the narrow end of slot 38 is presented to port 44, the propeller shaft then being at rest. The clutch pedal will move up (engage) slowly, and the propeller shaft will rotate slowly.

When the car attains the desired low gear speed, the operator takes his foot off the pedal 31, this action shutting off the by-pass in the actuator. The clutch pedal will be moved down (disengaged) and the operator may then shift gears to "second". He does so, and then steps on the manipulator pedal, whereupon the actuator will bleed more rapidly and will engage the clutch more rapidly, the increase in the speed of clutch engagement being due to the increase in propeller (vehicle) speed, and not being due to the fact that the gears are in "second".

A similar action takes place when the car is moving along in "second" gear and when it is desired to shift to "high" gear.

It will further be observed that relief 37 and port 44a provide an additional bleeder path, open gradually upon movement of pedal 31 to or near full advance position.

Figure 3:
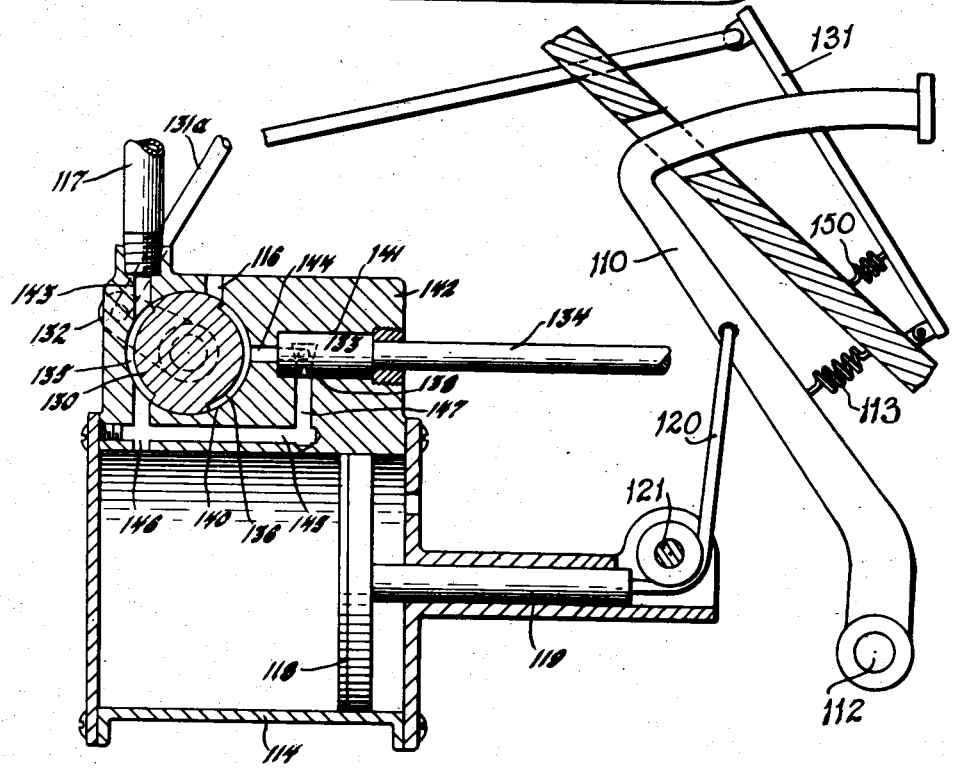
Fig. 3 shows a second form of clutch actuator.

Another form of clutch actuator which may well be used with the control means of Fig. 2, or with any other suitable control means, is shown in Fig. 3, and in this form the critical or controlling element is a cylindrical valve like that at 33, Fig. 2. This form of actuator is used with a clutch pedal 110, shaft 112, spring 113. It includes a cylinder 114 having a plunger 118, connected by a rod 119, and a cable 120, passing over pulley 121, to pedal 110.

It further has a valve 130 connected to pedal 131 by a link 131a and a crank 132, and also a valve 133 connected to a governor or control device by a rod 134. The valve 130 has reliefs 135 and 136, separated by ribs, as shown, and the valve 133 has a wedge shaped slot 138, and bores, not referenced, like those at 38a and 39 of Figure 1. The valves are rotatably disposed in chambers 140 and 141 of a valve body 142 and the latter is provided with ports 143 and 116, the former being connected to a source of low pressure medium (intake manifold) through conduit 117 and the latter being connected to a source of higher pressure medium (atmosphere).

The valve body further has the following ports: 143, (already mentioned) connecting chamber 140 with the low pressure line 117; 144, connecting chamber 140 with chamber 141; 146, connecting chamber 140 with the cylinder 114; and 147, connecting chamber 141 with the port 146 through a passage 145.

In this form of actuator, the operation is as follows; when the engine is not running the parts are as shown. As soon as the engine starts, with the pedal 131 up, suction in the manifold pulls plunger 118 to the left, disengaging the clutch. When the manipulator pedal is depressed, valve 130 is rotated, closing the low pressure port 143 and opening the high pressure port 116, whereupon the plunger 118 moves back (to the right) to clutch engaged position, this being caused by the bleeding in of pressure medium through 116—138—144—138—147—145—146, the speed of bleeding in, and consequently the speed of clutch engagement being controlled by the slot 138, whose position depends upon the speed of the propeller shaft.

It will be seen that whereas in the actuator of Fig. 1, the pressure medium was bled out of cylinder 14, or to the low pressure side of the piston, for clutch actuation, in this form, the pressure medium is bled into the cylinder 114, for the same reason.

Another form of actuator control means or variometer which may well be used with the actuators of Figs. 1 and 3, or with other forms of actuators, and which is operated by fluid, rather than by centrifugal or governor action, is shown in Figs. 4 and 5. In this form of control, there is provided a casing 160 having bearing portions 161 in which is journalled a shaft 163, the latter having a pinion 164 meshing with a gear 165 keyed to the propeller shaft 166. The speed of shaft 161 affects the position of a slidable shaft of a compound fluid valve, and the latter shaft is provided with rack teeth 172 meshing with a pinion 173 on the rod 234 of a valve (not shown) which corresponds to the valves 33 and 133 of the actuators of Figs. 1 and 3. Movement of the slidable shaft causes movement of the rod 234 and of the valve thereon, for reasons which have been described in the foregoing.

The slidable shaft above mentioned, and referenced 180 has a tapered head 181 seated in the tapered chamber 182 of a valve body 183, there being a spring 184 for urging the shaft down into position to close a port 185. A cap 186 on body 183 has ports 187 for reasons given hereafter.

The port 185 opens into a chamber 189, communicating with the inside of the casing 160 through a port 189a, and in which is eccentrically disposed a cylindrical rotor 190, the latter being fixed to the end of the rotating shaft 163 to rotate therewith. The rotor 190 is provided with sliding vanes 191 which, as the rotor rotates, cause transfer of lubricant from the lower interior of the casing 160 through ports 189a and 185, to the chamber 182, the lubricant then lifting the valve shaft 180 and escaping around the head 181 of the same, and out through the ports 187, back into the upper part of the casing.

It will be seen that the degree of lift of shaft 180, and consequently, the degree of rotation of actuator control rod 234, depends upon the speed of the rotor 190, for as the speed of latter increases (due to an increase in the propeller speed), the volume of oil which passes the head 181 will increase thus forcing the valve shaft 180 higher. In this fashion, the position of the actuator control rod 234, and the speed of the actuator is correlated to the propeller speed.

In Figs. 1b and 5a are shown parts, used together, for permitting a "stepped" variation of the size of the bleeder path, rather than the gradual variation thereof permitted by the parts of Figs. 1a and 5. The construction permits a slow engagement of the clutch, at all speeds below a change over speed of let us say five miles per hour, and a rapid engagement of the clutch, at all speeds above five miles per hour.

The valve of Fig. 1b, referenced 333 and attached to a control shaft 334, may take the place of valve 33 of Fig. 1. It has a stepped slot 338 of two different widths as shown, and has bores 338a and 339, like those at 38a and 39 of Fig. 1.

The valve of Fig. 1b may be used with the control of Fig. 5a, the latter in general resembling that of Fig. 5. This control has a slidable shaft 380 provided with a head 381 slidable in the cylindrical chamber 382 of body 383, there being a spring 384 for urging the shaft 380 down into position to close port 385. A cap 386 is provided with ports 387, as shown.

The shaft head 381 has a small groove 381a in its side, and the body 383 has a large port 383a in its side, as shown, opening into chamber 382.

The control of Fig. 5a cooperates with the valve of Fig. 1b, and with other parts, shown in Figs. 1-5 as follows: When the propeller shaft is at rest the shaft 380 will be held down by the spring 384, and valve 333 (Fig. 1b) will have its narrow part aligned with the bleeder port in its valve chamber. When the propeller shaft is rotated slowly at a speed below the change over speed, the small amount of fluid pumped by the rotor 190 (Fig. 5) will escape to ports 387 and back into the casing, through the groove 381a, the cross section of the latter being properly dimensioned, and the shaft 380 will not be lifted to move valve 333. Clutch engagement will therefore take place slowly though at a constant rate, so long as the propeller shaft speed is below the change over speed.

When the propeller shaft is rotated rapidly, at a speed greater than the change over speed, the rotor 190 will pump more fluid to the chamber 382 than the groove 381a can accommodate. The fluid will therefore lift shaft 380 to rotate valve 333 until the wide part of its slot 338 registers with the bleeder port, the lifting of shaft 380 continuing until the head 381 passes the large port 383a, after which the fluid escapes through the latter, without further effect on shaft 380. Accordingly, at all speeds of the propeller shaft above the change over speed, the valve 333 will be in position to permit clutch engagement rapidly, but at constant high speed.

Other forms of actuators and control devices might be suggested at this time, but are not here mentioned specifically, and it is to be understood that the scope of the invention of this application is to be determined, not by the foregoing detailed description of preferred embodiments, but the claims which follow.

What I claim is:

1. In an automotive vehicle having a manipulator pedal, a clutch and a driving part whose speed corresponds to that of the vehicle, means for actuating the clutch and speed sensitive means controlled by the speed of the driving part, the clutch actuating means being of the liquid pressure type, and including a clutch actuating plunger, a valve connected to the manipulator pedal, and a valve connected to the speed sensitive means, said speed sensitive means including a slidable shaft operatively connected to the driving part and responsive to liquid flow therearound induced by the driving part, the shaft being connected to the second one of the valves, the position of said second valve being determined by the position of said shaft.

2. In an automotive vehicle having a manipulator pedal, a clutch and a driving part whose speed corresponds to that of the vehicle, fluid pressure means for actuating said clutch including a clutch actuating plunger, speed sensitive means connected to and controlled by the speed of said driving part, a valve connected to the manipulator, and a valve connected to said speed sensitive means, said speed sensitive means including a slidable shaft operatively connected to the driving part and movable by means responsive to variations induced therein by the driving part, the shaft being connected to the second one of the valves, the position of the latter being determined by the position of said shaft.

TRACY BROOKS TYLER.